United States Patent
Rosdahl

[11] Patent Number: 5,845,405
[45] Date of Patent: Dec. 8, 1998

[54] CUTTING TOOL

[75] Inventor: Hans Rosdahl, Örneköldsvik, Sweden

[73] Assignee: Swing Cut AB, Sweden

[21] Appl. No.: 652,574

[22] Filed: Jul. 22, 1996

[30] Foreign Application Priority Data

Dec. 1, 1993 [SE] Sweden .................. 9303997-2

[51] Int. Cl.$^6$ ........................................ A01D 34/73
[52] U.S. Cl. ............... 30/276; 30/347; 56/12.7; 56/295; 56/DIG. 20
[58] Field of Search .......... 30/226, 347; 56/12.7, 56/17.5, 255, 295, DIG. 17, DIG. 20

[56] References Cited

U.S. PATENT DOCUMENTS

| 3,293,836 | 12/1966 | Heth ........................... 56/25.4 |
| 4,815,264 | 3/1989 | Mijinders .................... 56/295 |
| 4,827,702 | 5/1989 | Cerreta ..................... 30/276 X |
| 5,094,065 | 3/1992 | Azbell ........................ 56/255 |
| 5,209,052 | 5/1993 | Carroll .................. 56/DIG. 20 |
| 5,299,414 | 4/1994 | Long ....................... 56/295 X |

FOREIGN PATENT DOCUMENTS

| 355 924 | 5/1973 | Sweden . |
| 391967 | 8/1933 | United Kingdom . |
| 1 524 834 | 9/1978 | United Kingdom . |
| 1 570 252 | 6/1980 | United Kingdom . |
| 2 077 564 | 12/1981 | United Kingdom . |
| WO 81/00337 | 2/1981 | WIPO . |

Primary Examiner—Douglas D. Watts
Attorney, Agent, or Firm—Finnegan, Henderson, Farabow, Garrett & Dunner, L.L.P.

[57] ABSTRACT

A cutting tool for use with a brush cutter, trimmer or like device (1) for cutting thicket, grass and like vegetation, wherein the device includes a rotary shaft (3) for receiving a cutting tool which includes a rotatable center disc (6) which can be fitted to the tool and which includes cutting blades (9) having a cutting edge (10) along the front side of the blade as seen in the direction of rotation, wherein each individual cutting blade (9) is bent down through a first angle (v) such that the rear edge of the cutting blade (9) will be located closer to the ground than the edge-provided front side (10) of the blade when the center disc is held parallel with the ground, so that as the centre disc (6) rotates air will be pressed down towards the ground and therewith causes the tool to hover or lift slightly above the ground surface.

6 Claims, 2 Drawing Sheets

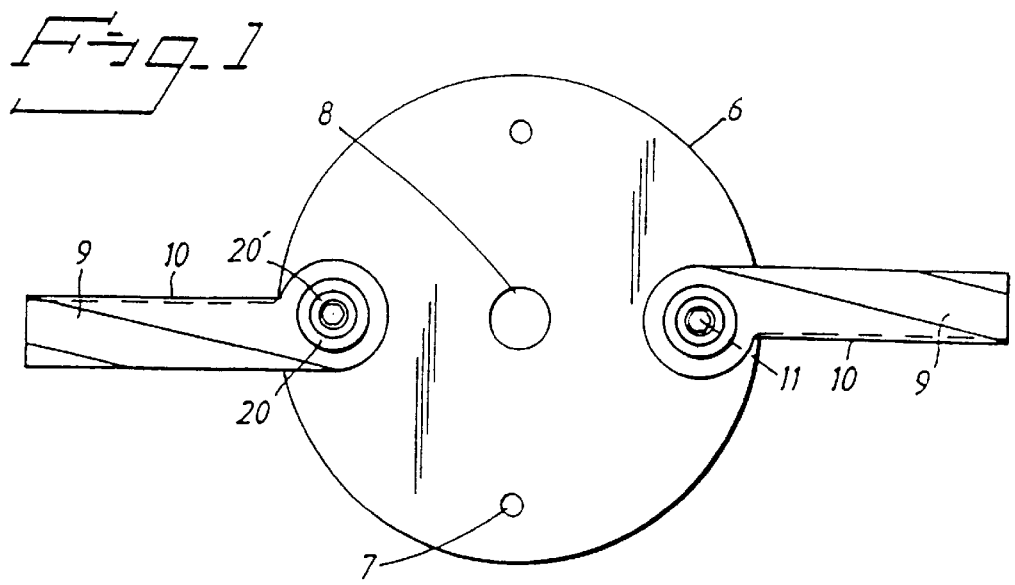
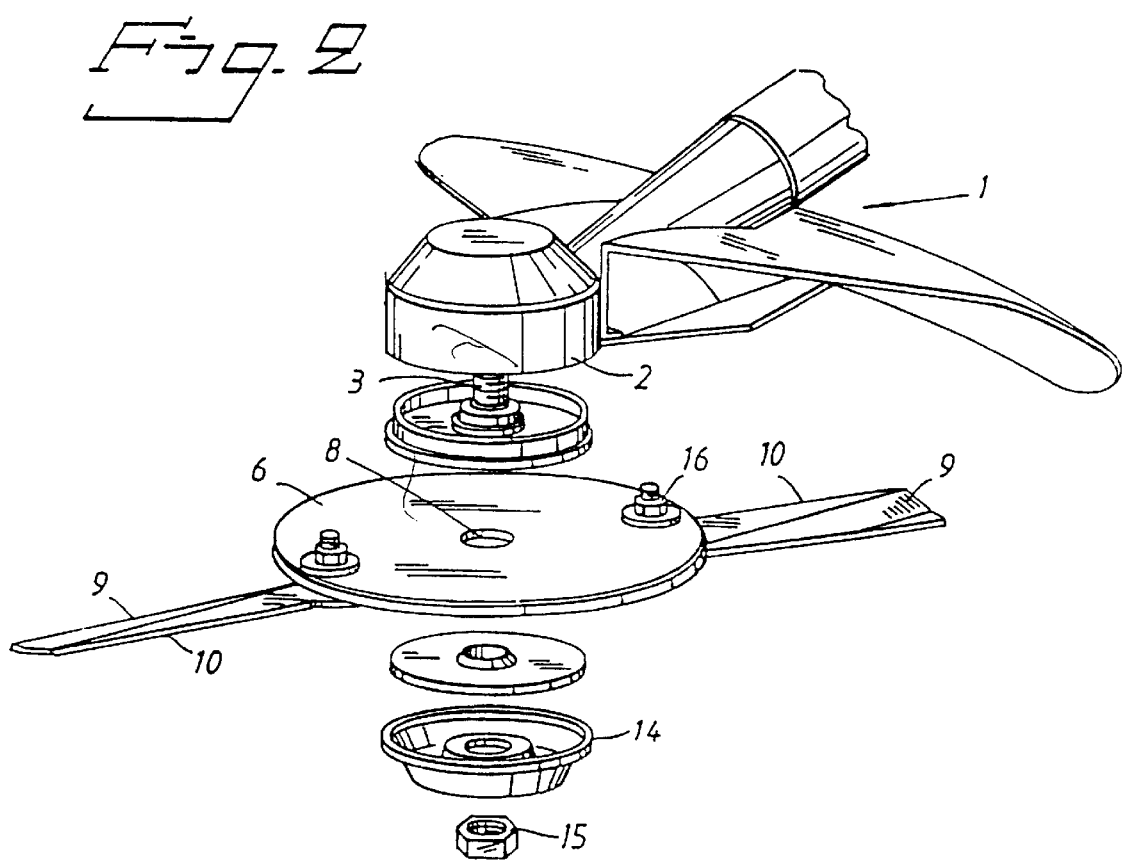

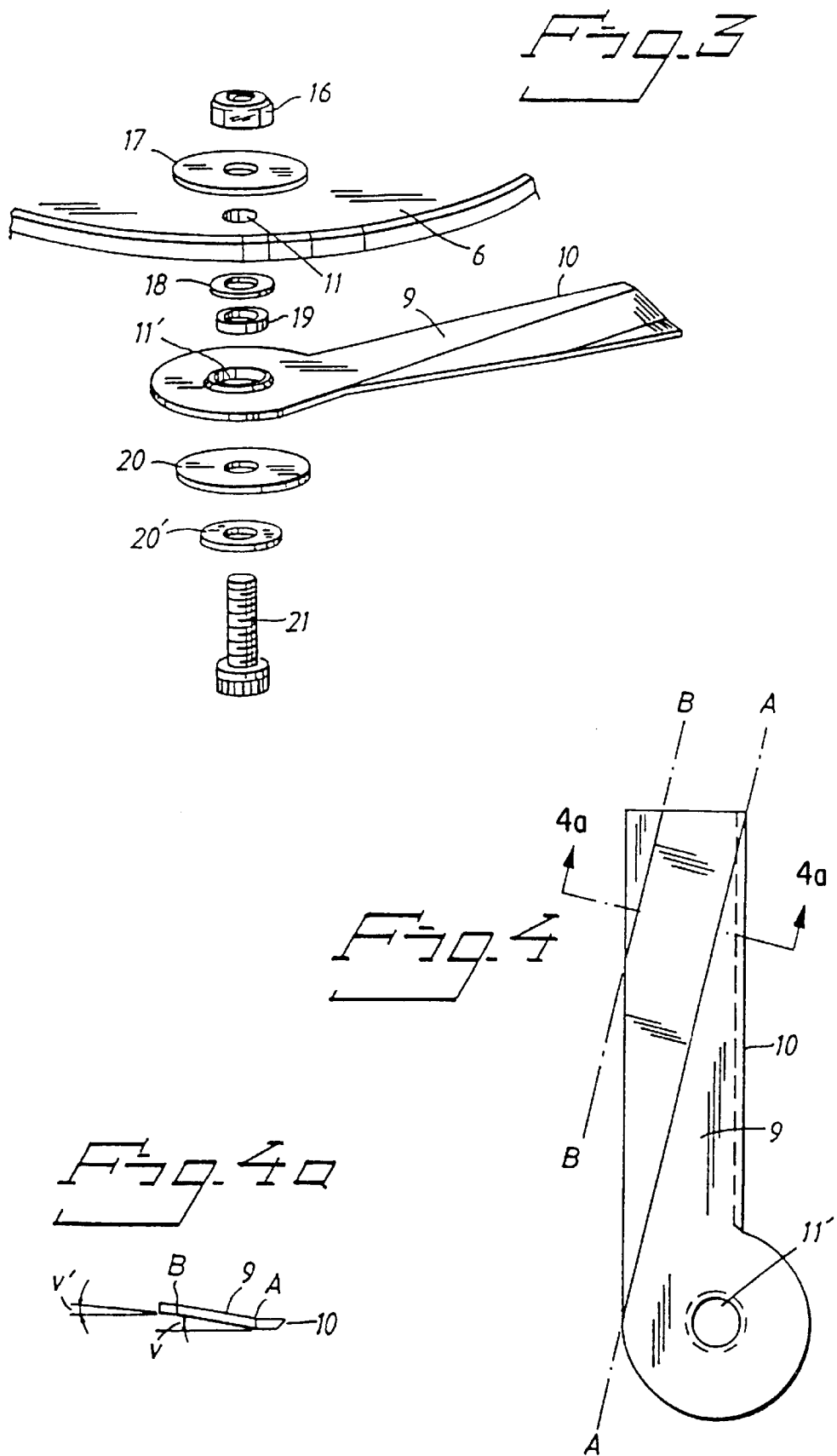

CUTTING TOOL

TECHNICAL FIELD

The present invention relates to a cutting tool which is intended to be fitted to a brush cutter, trimmer or like device for cutting thicket, grass and like vegetation, said device including a rotatable shaft which is intended to receive a cutting tool comprising a rotary centre disc which carries cutting blades and which can be attached to the cutting tool.

DESCRIPTION OF THE BACKGROUND ART

Many different solutions to the problem of cutting grass and thicket are known within this technical field, as is abundantly evident from publications WO-A1-81/00337, GB Abstract 391,967, GB-A 1,524,834 and 1,570,252, SE-B 355,924 and U.S. Pat. No. 3,293,836, which all teach fixed or pivotally mounted cutting blades.

Another type of device that is often used to cut grass is a trimmer which includes a rotating cord which functions to cut the grass. The cord may have a diameter of up to 3 mm and a cord of this diameter is also able to cut thick grass. However, it is difficult to cut other vegetation than grass with the aid of this tool. With a tool of this kind, however, there is a serious danger of the cutting cord snarling in the bevel gearing on the trimmer or brush cutter located immediately above the rotary plane of the cord, as a result of the movements that the cord is forced to make when whipping grass. In addition, the workman and the tool become heavily besmirched with grass and severed plant parts when cutting thick vegetation. Furthermore, cutting cords which extend too far out from the tool are liable to cause troublesome motor malfunctions.

Another known device for cutting thicket and like vegetation has the form of a cutter which includes three or four cutting edges fitted to a brush cutter. These cutters are heavy and difficult to angle, particularly when the plants to be cut have a thickness greater than 1–2 cm. In these cases, the brush cutter is liable to throw with considerable force, which acts deleteriously on both the brush cutter and the workman. The brush cutter is subjected to serious stresses and strains and the cutter is heavy and not easily manoeuvered. This known device is also liable to malfunction as a result of weeds, such as quitch or couch grass or the like, twisting together and snarling between the cutter and the bevel gear housing located above the cutter on the brush cutter. These disturbances take a long time to rectify and prevent work from being carried out smoothly in the manner intended.

When the tool is heavily covered with plant material, it is difficult to observe with tools of this kind any possible damage that the tool may possibly have sustained, for instance in the form of cracks or deformations. This layer of plant material is often fused firmly on the tool, therewith hiding possible deformations or cracks in the cutter.

In the case of the majority of these known devices, it is necessary to change tools to suit the thickness of the vegetation to be cut when the vegetation varies, which is a time-consuming and strenuous task and results in interruptions in the work in progress and also adds the additional burden of needing to take several different cutting tools and fitting tools to the working site.

SUMMARY OF THE INVENTIVE CONTEXT

The object of the present invention is to avoid the aforesaid drawbacks associated with trimmers and brush cutters, and to provide a tool which can be used to clear vegetation of varying thicknesses, such as grass and thicket, without needing to fit and dismantle various tools, or to make any adjustments or to take any other measures.

This object is achieved in accordance with the invention with a tool which includes a rotatable centre disc on which cutting knives or blades are pivotally mounted in pairs, with the blades mounted diametrically on the rotary centre disc, and are provided with a cutting edge on the front side thereof as seen in the direction of rotation, wherein each separate cutting blade is bent at an angle such that the rear blade edge is located closer to the ground than the front side of the blade that includes the cutting edge when the centre disc is held parallel with the ground, so that as the centre disc rotates, air will be pressed down towards the ground such as to cause the tool to hover or lift slightly above the ground.

Preferred embodiments of the invention are set forth in the following dependent claims.

The invention provides a vegetation clearing tool which is reliable in operation and which can be handled relatively easily, which creates a safer working environment, which is flexible in use, which is inexpensive to produce, which can be readily fitted to different trimmers or brush cutters, which can be repaired and maintained easily and cheaply, which includes means that indicate when the blades on the tool have become worn and need to be adjusted or replaced, which has a long useful life, and which, above all, makes the work of clearing vegetation both easy and enjoyable to perform.

BRIEF DESCRIPTION OF THE DRAWINGS

FIG. 1 shows from beneath an inventive cutting tool fitted with two cutting blades.

FIG. 2 shows the inventive tool fitted to a brush cutter or a trimmer.

FIG. 3 illustrates a screw joint used to secure a cutting blade to the central disc of the tool.

FIG. 4 illustrates a cutting blade in perspective; and FIG. 4a is a sectional view taken on the line 4a—4a in FIG. 4.

DETAILED DESCRIPTION OF A PREFERRED EMBODIMENT OF THE INVENTION

FIG. 1 shows from above an inventive cutting tool in a working mode with two cutting blades or knives 9 which are pivotally mounted in respective diametrically opposed holes provided in the rotary centre disc 6. The centre disc 6 includes further holes 7 in which more blades can be fitted or which can be used for alternative fitting or positioning of the blades, and a centre hole 8 for fitting the cutting tool to the rotatable shaft 3 of the trimmer or brush cutter.

FIG. 2 illustrates fitting of the inventive cutting tool to a brush cutter or trimmer. The trimmer 1 includes a bevel gear 2 having a rotatable shaft 3 on which the cutting tool comprised of a centre disc 6, provided with the centre hole 7 is fitted. The cutting blades 9 are pivotally mounted on the periphery of the centre disc 6 by means of a screw joint assembly. The trimmer also includes a nut guard 14 which is fitted to the shaft 3 and against which a nut 15 is tightened.

FIG. 3 illustrates the screw joint assembly by means of which respective cutting blades are fastened to the centre disc. The screw joint assembly includes a hardened steel bolt 21 on which there is first placed a safety washer 20' followed by another safety washer 20 whose diameter is larger than the safety washer 20'. These safety washers shall be deformable and are not therefore made of hardened steel. The cutting blade 9 is then fitted on the bolt 21, said cutting blade being provided with a hole 11 to this end and being made of hardened steel. A hardened steel spacing sleeve or bushing 18 is then placed on top of the cutting blade, wherewith the sleeve partially enters the hole 11 in the cutting blade. A hardened steel washer is then placed on top of the spacing sleeve and the bolt 21 is inserted through the hole 7 provided in the centre disc, whereafter a further safety washer, not made of hardened steel, is fitted on the end of the bolt. A nut 16 is then screwed onto the bolt and tightened.

FIG. 4 is a schematic in perspective illustration of a cutting blade or knife, which includes a rectangular part and a round attachment part. The cutting edge of the blade is referenced 10 and the attachment hole for coaction with the screw joint assembly is referenced 11. The cutting edge 10 extends along the front side of the rectangular part and has an edge angle of roughly 45° to the main plane of the blade. The cutting blade is bent down from the cutting edge 10 along the line A—A through an angle v of about 10° to the horizontal plane and is then bent back in the other direction along the line B—B in FIG. 4 through an angle v' of roughly 5°, as shown in FIG. 4a.

As a result of this angling of the cutting blades, the blades will function as propeller blades which, when in motion, lift the brush cutter so as to form an air-cushion which "supports" the cutter and makes the cutter easy to steer and handle. The air-cushion effect also assists in keeping the bottom surface of the brush cutter clean.

The brush cutter, or trimmer, works in the following manner. The tool is fitted to a brush cutter or a trimmer. The cutting blades are therewith swung in beneath the centre plate. The brush cutter or trimmer is then started, whereupon the cutting blades are subjected to centrifugal forces which cause the blades to be thrown radially outwards from the centre plate and to rotate with said plate with the cutting edges of the blades facing in the direction of rotation.

Should the cutting blades pivotally mounted on the centre plate meet with excessive resistance, the blades will be swung to one side and, when the resistance no longer acts on the blades, will again swing-out radially as a result of the centrifugal forces acting thereon. This protects the cutting blades from damage and provides smoother action of the brush cutter. When the brush cutter or trimmer is switched off, the cutting blades can be swung in beneath the centre disc and the tool inspected. As before mentioned, the safety washers 20, 20' and 17 included in the screw joint assembly are manufactured from a softer material than the bolt, the bearing sleeve and the steel washer. When the cutting blades are subjected to an excessively hard or heavy load, the safety washers will be deformed (normally the edges of the washers are bent upwards) and it is thus an easy matter to establish whether or not the tool has been subjected to wear or has been deformed. These washers can then be easily replaced, as can also the cutting blades if necessary.

If the mounting holes 11 in the cutting blades are deformed, the blades can be fitted in the two remaining holes.

Because the centre plate has a large mass the tool can be maintained at the speed that is reached when cutting vegetation with a small energy input. Furthermore, which also reduces heavy wear on the tool.

Because grass and thicket is clipped and not torn when using the inventive tool, the soiling of clothes with chlorophyll is avoided.

It will be understood that the invention is not restricted to the illustrated and described embodiment and that modifications can be made within the scope of the following claims.

I claim:

1. A cutting tool for use with a brush cutter, trimmer or like device (1) for cutting thicket, grass and the like vegetation, wherein the device includes a rotary shaft (3) for receiving a cutting tool which includes a rotatable centre disc (6) which is fitted to the tool and which includes cutting blades (9) having a cutting edge (10) along the front side of the blade as seen in the direction of rotation, characterized in that each individual cutting blade (9) is bent down through a first angle (v) such that the rear edge of the cutting blade (9) will be located closer to the ground than the edge-provided front side (10) of the blade when the centre disc is held parallel with the ground and in that the rear edge of the cutting blades is bent upwards through a second angle (v'), so that as the centre disc (6) rotates air will be pressed down towards the ground and therewith causes the tool to hover or lift slightly above the ground surface.

2. A cutting tool according to claim 1, characterized in that the cutting blades (9) are elongated and are pivotally mounted in pairs on the rotatable centre disc (6).

3. A cutting tool according to claim 1, characterized in that the cutting blades (9) are elongated and are pivotally mounted with the aid of a screw joint assembly which includes deformable safety washers (20, 20', 17).

4. A cutting tool according to any one of the preceding claims, characterized in that the first angle (v) is roughly 10°.

5. A cutting tool according to any one of the preceding claims, characterized in that the second angle(v') is about 5°.

6. A cutting tool according to claim 1, characterized in that the cutting edge (10) extends along the whole of the front sife of the cutting blade.

* * * * *